United States Patent
Takaoka et al.

(10) Patent No.: US 11,106,291 B2
(45) Date of Patent: Aug. 31, 2021

(54) KNOB AND INPUT DEVICE

(71) Applicant: MITSUBISHI ELECTRIC CORPORATION, Tokyo (JP)

(72) Inventors: Shinya Takaoka, Tokyo (JP); Akinori Tsukaguchi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/650,228

(22) PCT Filed: Oct. 11, 2017

(86) PCT No.: PCT/JP2017/036774
§ 371 (c)(1),
(2) Date: Mar. 24, 2020

(87) PCT Pub. No.: WO2019/073541
PCT Pub. Date: Apr. 18, 2019

(65) Prior Publication Data
US 2020/0278761 A1 Sep. 3, 2020

(51) Int. Cl.
*G06F 3/02* (2006.01)
*G06F 3/0362* (2013.01)
(Continued)

(52) U.S. Cl.
CPC .......... *G06F 3/0362* (2013.01); *G06F 3/044* (2013.01); *G06F 3/0412* (2013.01)

(58) Field of Classification Search
CPC ........ G06F 1/1624; G06F 1/1662; G06F 3/02; G06F 3/0238; G06F 3/03547;
(Continued)

(56) References Cited

U.S. PATENT DOCUMENTS 6,636,197 B1 * 10/2003 Goldenberg ............. G05G 1/08
345/156
7,297,883 B2 * 11/2007 Rochon ................ H01H 25/041
200/5 R
(Continued)

FOREIGN PATENT DOCUMENTS

| JP | 2016-45525 A | 4/2016 |
| WO | WO 2016/041683 A1 | 3/2016 |
| WO | WO 2016/170908 A1 | 10/2016 |

OTHER PUBLICATIONS

German Office Action. dated Jan. 11, 2021, for German Application 112017007886.5, with an English translation.

*Primary Examiner* — Lunyi Lao
*Assistant Examiner* — Jarurat Suteerawongsa
(74) *Attorney, Agent, or Firm* — Birch, Stewart, Kolasch & Birch, LLP

(57) ABSTRACT

It includes: an operation portion comprised of a ring-shaped conductive member, a rotational operation being performed on the operation portion; a rotary supporting member comprised of a ring-shaped non-conductive member and fixed onto a capacitive type touch panel, the rotary supporting member rotatably supporting the operation portion; a ring-shaped concave groove disposed in the rotary supporting member; and conductive conducting terminal portions electrically connected to the operation portion, the conductive conducting terminal portions being rotated inside the concave groove integrally with the operation portion, positions of the conducting terminal portions being detected by the touch panel, wherein the operation portion is divided into a plurality of areas electrically insulated from each other in a circumferential direction, and at least two of the conducting terminal portions are mounted to different areas of the plurality of areas.

4 Claims, 8 Drawing Sheets

(51) Int. Cl.
*G06F 3/041* (2006.01)
*G06F 3/044* (2006.01)

(58) Field of Classification Search
CPC ........ G06F 3/041; G06F 3/0414; G06F 3/046;
G06F 3/047; G06F 2203/041; G06F
2203/04107; G06F 2203/04111; G06F
2203/04112; G06F 3/033; G06F 3/03545;
G06F 2203/04101; G06F 3/0317; G06F
3/03542; G06F 3/0386; G06F 3/0312;
G06F 3/03543; G06F 3/03548; G06F
3/04847; G06F 3/0362; G06F 3/0412;
G06F 3/044; G06F 3/0338; G06Q 20/20
See application file for complete search history.

(56) References Cited

U.S. PATENT DOCUMENTS

| | | | | |
|---|---|---|---|---|
| 2007/0242057 | A1* | 10/2007 | Zadesky | G06F 3/0485 |
| | | | | 345/173 |
| 2010/0026532 | A1* | 2/2010 | Shimizu | G06F 3/0202 |
| | | | | 341/35 |
| 2015/0378480 | A1* | 12/2015 | Craig | G06F 3/0393 |
| | | | | 345/174 |
| 2017/0182890 | A1 | 6/2017 | Ruemelin et al. | |
| 2017/0316901 | A1* | 11/2017 | Sawada | H01H 15/06 |
| 2018/0046267 | A1 | 2/2018 | Kobayashi | |

\* cited by examiner

○ At Time of Touch of Finger

△ At Time of Non-Touch of Any Finger

KNOB AND INPUT DEVICE

TECHNICAL FIELD

The present invention relates to a knob for operating a touch panel, and an input device in which the knob is fixed to the touch panel.

BACKGROUND ART

In recent years, many displays each with a capacitive type touch panel (hereinafter each referred to as "touch panel-equipped display") have been adopted for navigation devices, audio devices, center displays, and so on which are mounted in vehicles. Since each touch panel-equipped display does not have an uneven shape on a surface thereof, it is difficult to operate a touch panel-equipped display unless this touch panel-equipped display is being visually recognized.

Patent Literature 1 discloses an input device in which a knob is fixed to a touch panel-equipped display in order to improve the ease of operation of the touch panel-equipped display. The knob includes a gripping portion for allowing a user to perform an operation, and a terminal portion that serves as a contact surface for the touch panel. When the user's finger touches the gripping portion, current flows through the terminal portion via the gripping portion, and the capacitance of the touch panel changes depending on the current. The touch panel detects a touch of a finger on the basis of the difference between the capacitance at the time of non-touch of any finger and the capacitance at the time of the touch of the finger.

CITATION LIST

Patent Literature

Patent Literature 1: JP 2016-45525 A

SUMMARY OF INVENTION

Technical Problem

A problem with the input device disclosed in Patent Literature 1 is that when the difference between the capacitance at the time of non-touch of any finger and the capacitance at the time of a touch of a finger is small, non-detection or erroneous detection of a touch of a finger on the knob occurs.

The present invention is made in order to solve the above-mentioned problem, and it is therefore an object of the present invention to provide a technique for preventing the occurrence of non-detection and erroneous detection of a touch of a finger on a knob.

Solution to Problem

According to the present invention, there is provided a knob including: an operation portion comprised of a ring-shaped conductive member, a rotational operation being performed on the operation portion; a rotary supporting member comprised of a ring-shaped non-conductive member and fixed onto a capacitive type touch panel, the rotary supporting member rotatably supporting the operation portion; a ring-shaped concave groove disposed in the rotary supporting member; and conductive conducting terminal portions electrically connected to the operation portion, the conductive conducting terminal portions being rotated inside the concave groove integrally with the operation portion, positions of the conducting terminal portions being detected by the touch panel, wherein the operation portion is divided into a plurality of areas electrically insulated from each other in a circumferential direction, and at least two of the conducting terminal portions are mounted to different areas of the plurality of areas.

Advantageous Effects of Invention

According to the present invention, the occurrence of non-detection and erroneous detection of a touch of a finger on the knob can be prevented.

DESCRIPTION OF EMBODIMENTS

Hereinafter, in order to explain the present invention in greater detail, embodiments of the present invention will be described with reference to the accompanying drawings.

Embodiment 1

Figure 1:
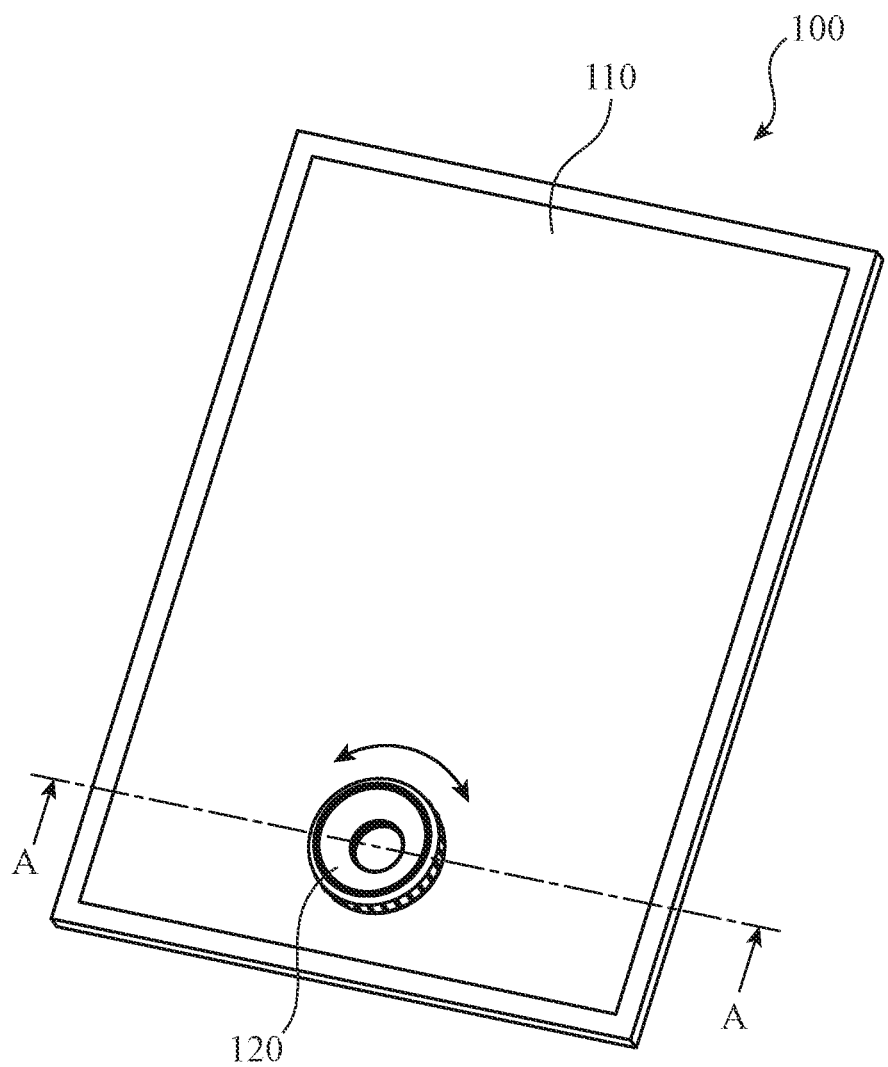
FIG. 1 is a perspective view of an input device according to Embodiment 1.

FIG. 1 is a perspective view of an input device 100 according to Embodiment 1.

The input device 100 includes a touch panel-equipped display 110 and a knob 120. The touch panel-equipped display 110 includes a capacitive type touch panel 111 (hereinafter referred to as "touch panel 111"), and a display (not illustrated). The display is integral with the touch panel 111.

The knob 120 is fixed onto the touch panel 11*l*. The knob 120 is shaped like a ring. The knob 120 is constructed in such a way as to be rotatable in directions of a double-headed arrow shown in FIG. 1. Since the touch panel 111 is exposed inside a ring in the knob 120, information displayed on the display can be visually recognized.

Figure 2:
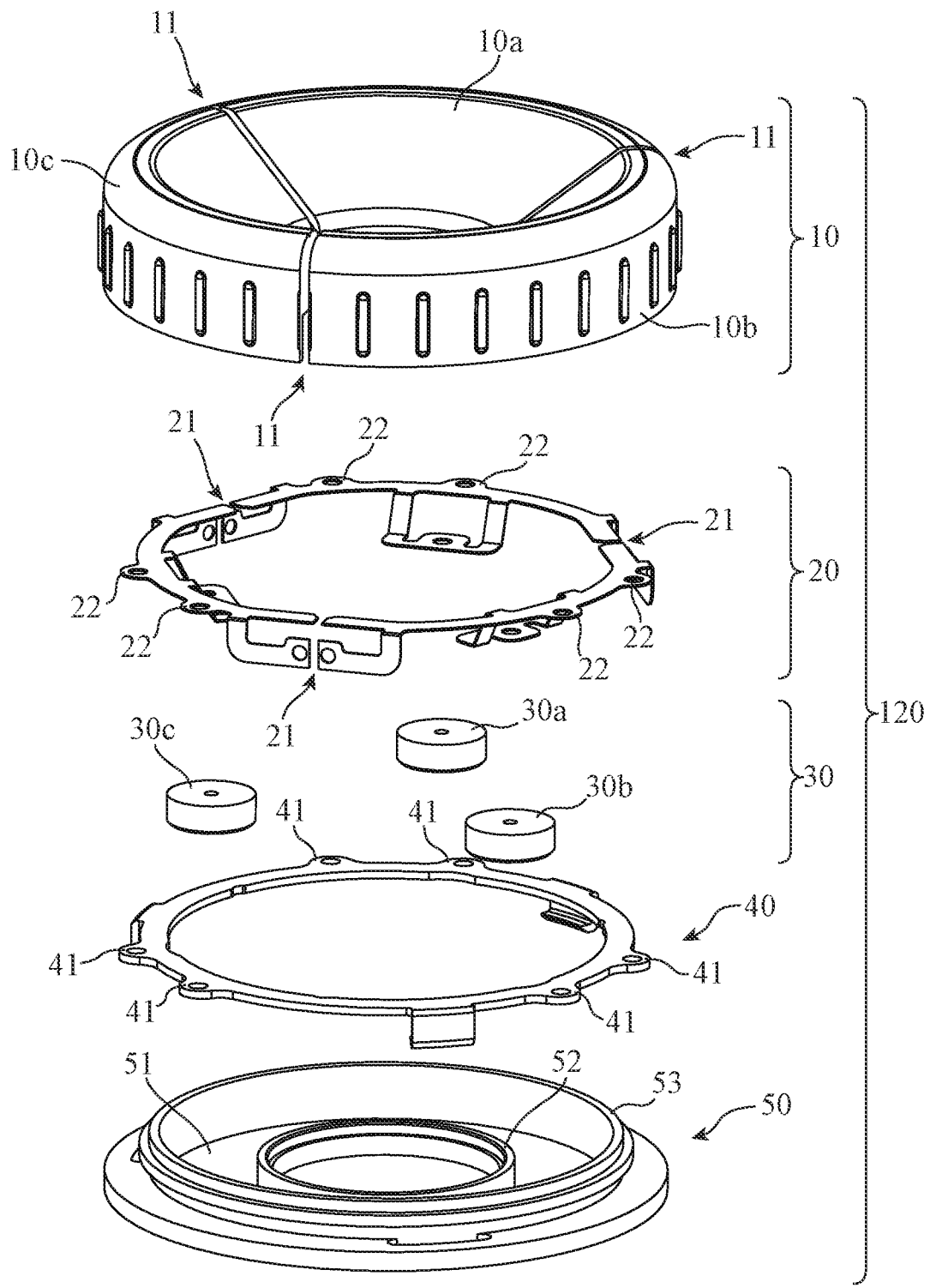
FIG. 2 is an exploded view of a knob according to Embodiment 1.

FIG. 2 is an exploded view of the knob 120 according to Embodiment 1.

The knob 120 mainly includes an operation portion 10, a conductive connecting member 20, conducting terminal portions 30, a rotary member 40, and a rotary supporting member 50.

Figure 3:
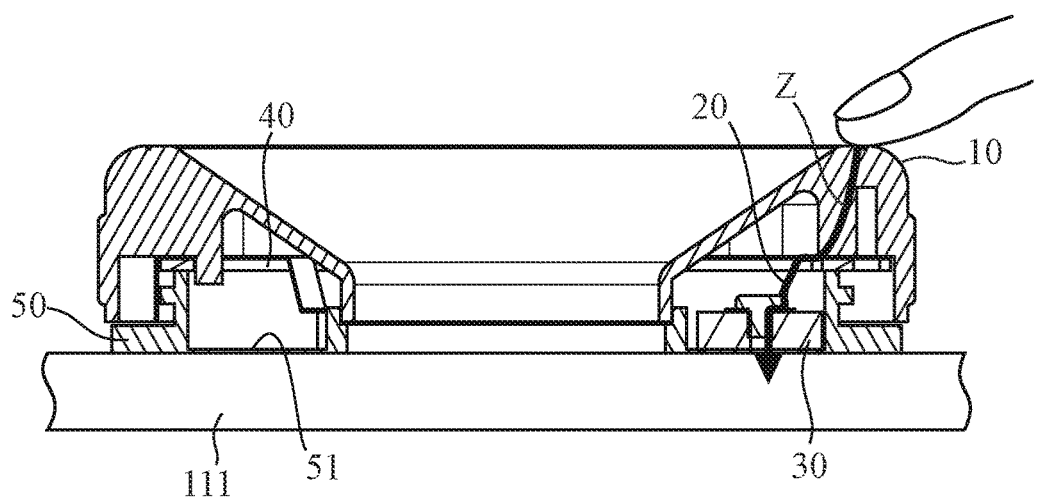
FIG. 3 is a cross-sectional view of the input device, taken along line A-A shown in FIG. 1.

FIG. 3 is a cross-sectional view of the input device 100, taken along line A-A shown in FIG. 1.

Figure 4:
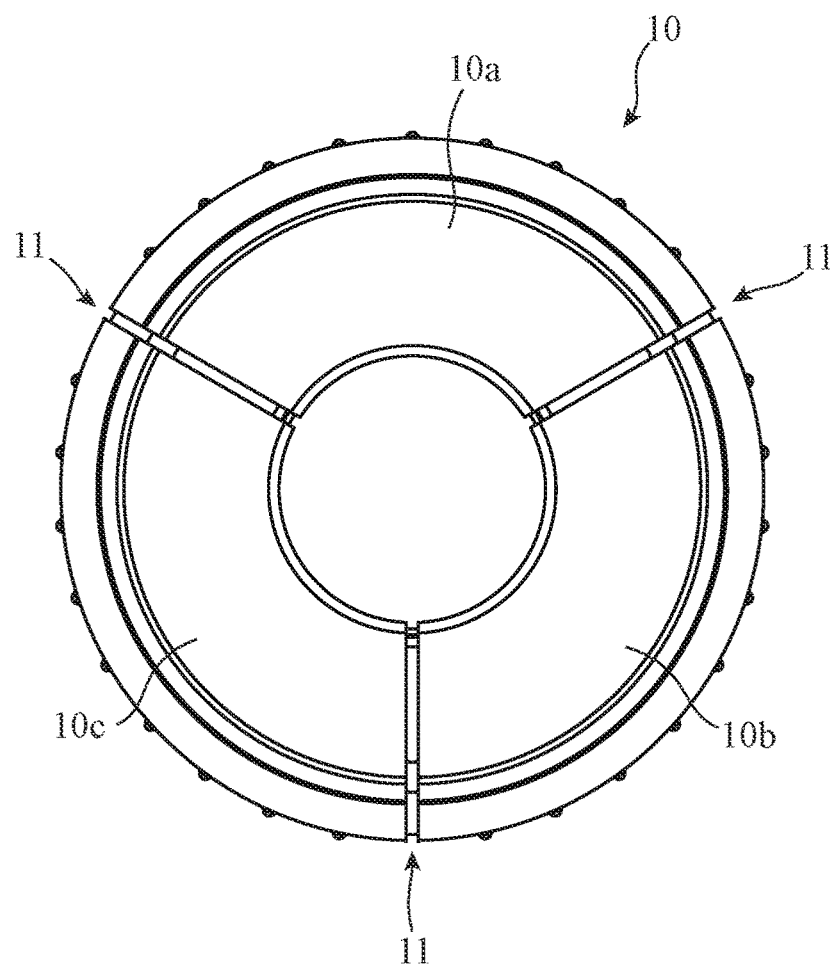
FIG. 4 is a diagram in which an operation portion of the knob is viewed from an upper surface.

FIG. 4 is a diagram in which the operation portion 10 of the knob 120 according to Embodiment 1 is viewed from an upper surface.

The operation portion 10 is a ring-shaped part. The operation portion 10 is a part on which a rotational operation is performed. The operation portion 10 is comprised of a conductive member. The operation portion 10 is a part in which, for example, conductive coating or plating treatment is applied to a resin such as ABS.

A plurality of operation portion dividing portions 11 are disposed in the operation portion 10. The operation portion 10 is divided by the plurality of operation portion dividing portions 11 into a plurality of areas along a circumferential direction.

FIG. 4 shows an example in which the operation portion dividing portions 11 are disposed at three places and the operation portion 10 is divided into three areas. The operation portion 10 is divided by the operation portion dividing portions 11 at the three places into a first operation portion 10a, a second operation portion 10b, and a third operation portion 10c.

The first operation portion 10a and the second operation portion 10b are joined in a state in which they are electrically insulated from each other. This joining is, for example, adhesion. Similarly, the second operation portion 10b and the third operation portion 10c are joined in a state in which they are electrically insulated from each other. Similarly, the third operation portion 10c and the first operation portion 10a are joined in a state in which they are electrically insulated from each other.

The rotary supporting member 50 is a ring-shaped part. The rotary supporting member 50 is comprised of a non-conductive member. For example, the rotary supporting member 50 is comprised of a resin such as ABS. The rotary supporting member 50 is fixed onto the touch panel 111. This fixation is, for example, adhesion. The rotary supporting member 50 rotatably supports the operation portion 10.

As shown in FIG. 2, the rotary supporting member 50 has a ring-shaped concave groove 51. The concave groove 51 is formed of a first wall portion 52 erected on an inner periphery side, and a second wall portion 53 erected on an outer periphery side of the first wall portion 52. A bottom surface of the concave groove 51 is formed in such a way that its thickness is reduced. The thickness is, for example, 0.3 mm.

As shown in FIG. 2, the conductive connecting member 20, the conducting terminal portions 30, and the rotary member 40 are contained between the operation portion 10 and the rotary supporting member 50.

The conductive connecting member 20 is a ring-shaped part. The conductive connecting member 20 is comprised of a conductive member. For example, the conductive connecting member 20 is comprised of stainless steel. A plurality of conductive connecting member dividing portions 21 are disposed in the conductive connecting member 20. The conductive connecting member 20 is divided by the plurality of conductive connecting member dividing portions 21 into a plurality of areas along a circumferential direction.

Figure 5:
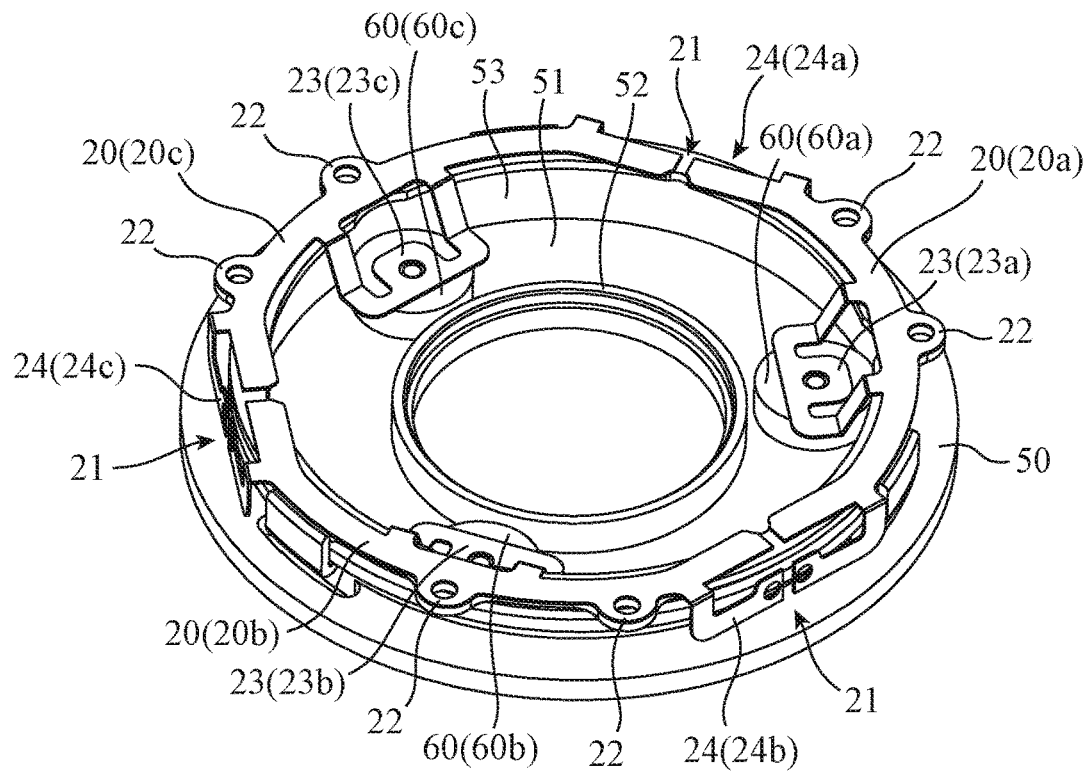
FIG. 5 is a perspective view of the knob (the operation portion is not illustrated)

FIG. 2 shows an example in which the conductive connecting member dividing portions 21 are disposed at three places and the conductive connecting member 20 is divided into three areas. As shown in FIG. 5, the conductive connecting member 20 is divided by the conductive connecting member dividing portions 21 at the three places into a first conductive connecting member 20a, a second conductive connecting member 20b, and a third conductive connecting member 20c.

The first conductive connecting member 20a and the second conductive connecting member 20b are joined in a state in which they are electrically insulated from each other. This joining is, for example, adhesion. Similarly, the second conductive connecting member 20b and the third conductive connecting member 20c are joined in a state in which they are electrically insulated from each other. Similarly, the third conductive connecting member 20c and the first conductive connecting member 20a are joined in a state in which they are electrically insulated from each other.

In the above-mentioned example, both the operation portion 10 and the conductive connecting member 20 are parts (referred to as "joined parts") each comprised of portions that are connected to each other. However, either the operation portion 10 or the conductive connecting member 20 may be a part (referred to as "non-joined part") not comprised of portions that are connected to each other. For example, the operation portion 10 may be a joined part while the conductive connecting member 20 may be a non-joined part. In that case, respective clearances are disposed between the first conductive connecting member 20a and the second conductive connecting member 20b, between the second conductive connecting member 20b and the third conductive connecting member 20c, and between the third conductive connecting member 20c and the first conductive connecting member 20a.

FIG. 5 is a perspective view of the knob 120 according to Embodiment 1 (the operation portion 10 is not illustrated).

As shown in FIG. 5, the conductive connecting member 20 is formed with a plurality of conductive connecting member flange portions 22. Each conductive connecting member flange portion 22 has a shape projecting outwardly in a radial direction. A hole via which a screw is inserted is formed in each conductive connecting member flange portion 22.

A conductive connecting member flange portion 22 is formed at at least one place of the first conductive connecting member 20a. Similarly, a conductive connecting member flange portion 22 is formed at at least one place of the second conductive connecting member 20b. Similarly, a conductive connecting member flange portion 22 is formed at at least one place of the third conductive connecting member 20c.

A plurality of mounting portions 23 for mounting the conducting terminal portions 30, which will be mentioned later, are formed in the conductive connecting member 20. Hereinafter, a case in which a first mounting portion 23a, a second mounting portion 23b, and a third mounting portion 23c are formed as the mounting portions 23 will be explained. The mounting portion 23 formed in the first conductive connecting member 20a is referred to as the first mounting portion 23a. Similarly, the mounting portion 23 formed in the second conductive connecting member 20b is referred to as the second mounting portion 23b. Similarly, the mounting portion 23 formed in the third conductive connecting member 20c is referred to as the third mounting portion 23c. Holes screws are inserted are formed in the first mounting portion 23a, the second mounting portion 23b, and the third mounting portion 23c.

The conducting terminal portions 30 are disk-shaped conductive member parts. The conducting terminal portions 30 are comprised of, for example, stainless steel. The conducting terminal portions 30 are mounted to the mounting portions 23 of the conductive connecting member 20 by, for example, screw fastening. The conducting terminal portions 30 and the conductive connecting member 20 are in contact with each other, and they are electrically connected to each other.

Hereinafter, the conducting terminal portion 30 mounted to the first mounting portion 23a is referred to as the first conducting terminal portion 30a. Similarly, the conducting terminal portion 30 mounted to the second mounting portion 23b is referred to as the second conducting terminal portion 30b. Similarly, the conducting terminal portion 30 mounted to the third mounting portion 23c is referred to as the third conducting terminal portion 30c. Holes via which screws are inserted are formed in the first conducting terminal portion 30a, the second conducting terminal portion 30b, and the third conducting terminal portion 30c.

As shown in FIG. 2, the rotary member 40 is a ring-shaped part. The rotary member 40 is comprised of a non-conductive member. For example, the rotary member 40 is comprised of a resin such as ABS. The rotary member 40 is rotatably supported by the rotary supporting member 50. A plurality of rotary member flange portions 41 are formed in the rotary member 40. Each rotary member flange portion 41 has a shape projecting outwardly in a radial direction. The rotary member flange portions 41 are formed at positions opposite to the conductive connecting member flange portions 22. A hole via which a screw is inserted is formed in each rotary member flange portion 41.

The mounting of the conductive connecting member 20 and the rotary member 40 to the operation portion 10 is implemented via the conductive connecting member flange portions 22 and the rotary member flange portions 41. The mounting is, for example, screw fastening. The conductive connecting member 20 and the operation portion 10 are in contact with each other and are electrically connected. Further, the conductive connecting member 20 and the rotary member 40 rotate integrally with the operation portion 10. At this time, the conducting terminal portions 30 mounted to the conductive connecting member 20 slide inside the concave groove 51 in the rotary supporting member 50.

As shown in FIG. 5, the first mounting portion 23a, the second mounting portion 23b, and the third mounting portion 23c have shapes projecting inwardly in a radial direction. The first mounting portion 23a, the second mounting portion 23b, and the third mounting portion 23c can become elastically deformed toward a direction perpendicular to the surface of the touch panel 111.

The first mounting portion 23a presses the first conducting terminal portion 30a to the surface of the touch panel 111. Similarly, the second mounting portion 23b presses the second conducting terminal portion 30b to the surface of the touch panel 111. Similarly, the third mounting portion 23c presses the third conducting terminal portion 30c to the surface of the touch panel 111. As a result, the first conducting terminal portion 30a, the second conducting terminal portion 30b, and the third conducting terminal portion 30c can be prevented from floating from the concave groove 51, and the detection of a touch of a finger and the detection of the positions of the conducting terminal portions 30 are stabilized.

When a finger touches the operation portion 10, current flows along a path shown by an arrow Z shown in FIG. 3. Since the rotary supporting member 50 is a non-conductive member, but the bottom surface of the concave groove 51 has a thin thickness, a change of the capacitance occurs in the touch panel 111 because of the current. The touch panel 111 detects a touch of a finger and detects the positions of the conducting terminal portions 30 on the basis of the change of the capacitance.

As shown in FIG. 5, a plurality of contact portions 24 in contact with the second wall portion 53 in the rotary supporting member 50 are formed in the conductive connecting member 20. Hereinafter, a case in which a first contact portion 24a, a second contact portion 24b, and a third contact portion 24c are formed as the contact portions 24 will be explained. The contact portion 24 formed in the first conductive connecting member 20a is referred to as the first contact portion 24a. Similarly, the contact portion 24 formed in the second conductive connecting member 20b is referred to as the second contact portion 24b. Similarly, the contact portion 24 formed in the third conductive connecting member 20c is referred to as the third contact portion 24c. The first contact portion 24a, the second contact portion 24b, and the third contact portion 24c have shapes projecting toward the touch panel 111, and they can become elastically deformed in a radial direction.

The first contact portion 24a, the second contact portion 24b, and the third contact portion 24c apply forces in a direction toward the center of rotation to the second wall portion 53 in the rotary supporting member 50. By constructing the contact portions in this way, a frictional force occurs between the conductive connecting member 20 and the rotary supporting member 50 as the operation portion 10 rotates. By adjusting the magnitude of the frictional force, the feeling of operating the knob 120 can be adjusted.

Figure 6:
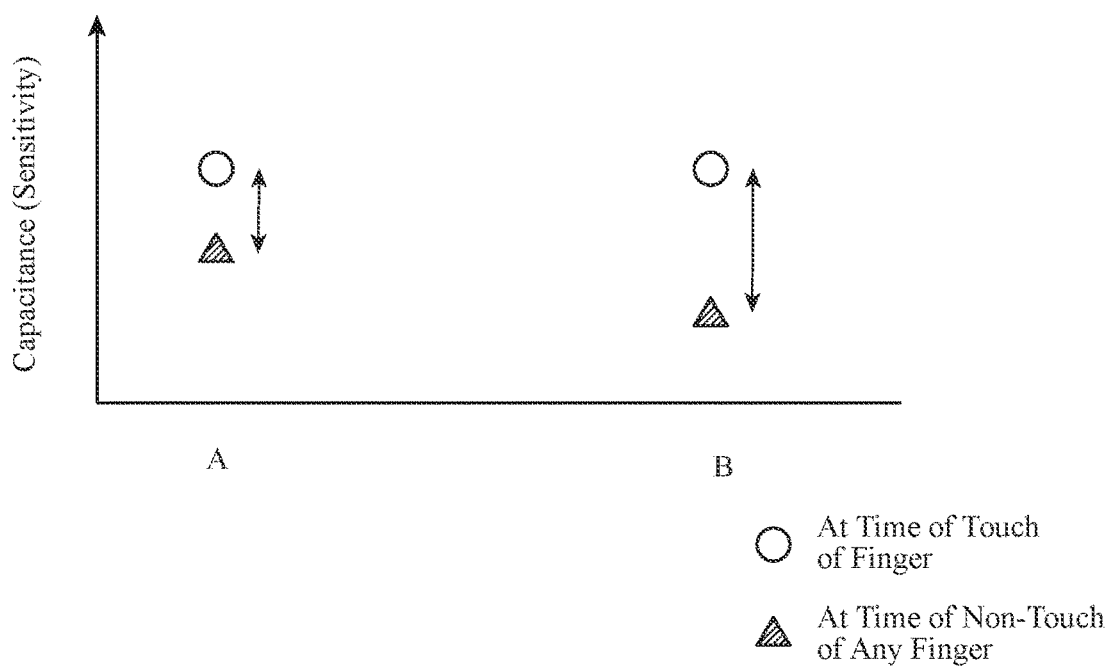
FIG. 6 is a graph for explaining a change of the capacitance detected by a touch panel.

FIG. 6 is a graph for explaining a change in the capacitance detected by the touch panel 111.

FIG. 6 shows the capacitance detected by the touch panel 111 when no finger touches the operation portion 10 (at the time of non-touch of any finger), and the capacitance detected by the touch panel 111 when a finger touches the operation portion 10 (at the time of a touch of a finger).

A left-hand side (hereinafter referred to as "A") of FIG. 6 shows a case in which the operation portion 10 and the conductive connecting member 20 are not divided. On the other hand, a right-hand side (hereinafter referred to as "B") of FIG. 6 shows a case in which the operation portion 10 and the conductive connecting member 20 are divided into three parts, just as in the case of this Embodiment 1.

In the case of "B", as a result of dividing the operation portion 10 and the conductive connecting member 20 that are parts with a large capacitance, the capacitance detected by the touch panel 111 at the time of non-touch of any finger becomes small. As a result, the difference (the amount of change of the capacitance) between the capacitance detected by the touch panel 111 at the time of non-touch of any finger and the capacitance detected by the touch panel 111 at the time of a touch of a finger increases as compared with the case of "A". As a result, the accuracy with which to detect a touch of a finger on the operation portion 10 can be improved.

In the above explanation, the case in which the operation portion 10 and the conductive connecting member 20 are divided into three parts, and the number of conducting terminal portions 30 is three is explained. However, it is not limited to this case, and the operation portion 10 and the conductive connecting member 20 may be divided into two parts, and the number of conducting terminal portions 30 may be two.

Further, the operation portion 10 and the conductive connecting member 20 may be divided into four or more parts. In that case, the number of conducting terminal portions 30 is determined in accordance with the number of divisions of the operation portion 10 and the conductive connecting member 20. However, it is not necessary to make the number of conducting terminal portions 30 be equal to the number of divisions of the operation portion 10 and the conductive connecting member 20. For example, in the case in which the operation portion 10 and the conductive connecting member 20 are divided into three parts, the number of conducting terminal portions 30 may be two. In that case, for example, the first conducting terminal portion 30a is mounted to the first operation portion 10a, the second conducting terminal portion 30b is mounted to the second operation portion 10b, and no conducting terminal portion is mounted to the third operation portion 10c.

The operation portion 10 and the conductive connecting member 20 are divided into a plurality of areas, and at least two or more conducting terminal portions 30 are mounted to different ones of the plurality of areas.

As mentioned above, the knob 120 according to Embodiment 1 includes: the operation portion 10 comprised of a ring-shaped conductive member, a rotational operation being performed on the operation portion; the rotary supporting member 50 comprised of a ring-shaped non-conductive member and fixed onto the capacitive type touch panel 111, for rotatably supporting the operation portion 10; the ring-shaped concave groove 51 disposed in the rotary supporting member 50; and the conductive conducting terminal portions 30 electrically connected to the operation portion 10 and rotating inside the concave groove 51 integrally with the operation portion 10, the positions of the conducting terminal portions being detected by the touch panel 111, wherein the operation portion 10 is divided into a plurality of areas electrically insulated from each other in a circumferential direction and at least two or more conducting terminal portions 30 are mounted to different ones of the plurality of areas. As a result, the occurrence of non-detection and erroneous detection of a touch of a finger on the knob can be prevented.

Embodiment 2

Figure 7:
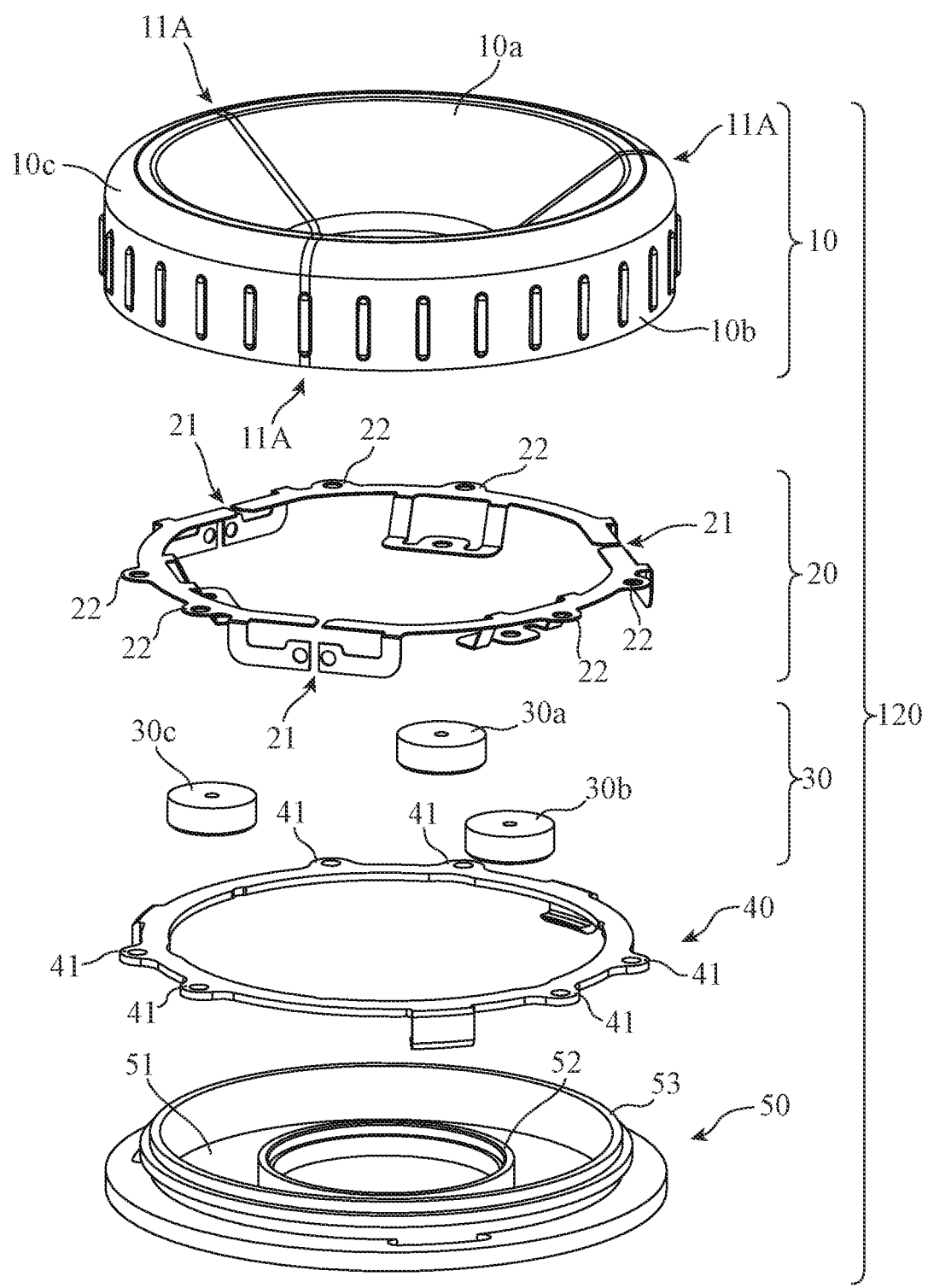
FIG. 7 is an exploded view of a knob according to Embodiment 2.

FIG. 7 is an exploded view of a knob 120 according to Embodiment 2.

Figure 8:
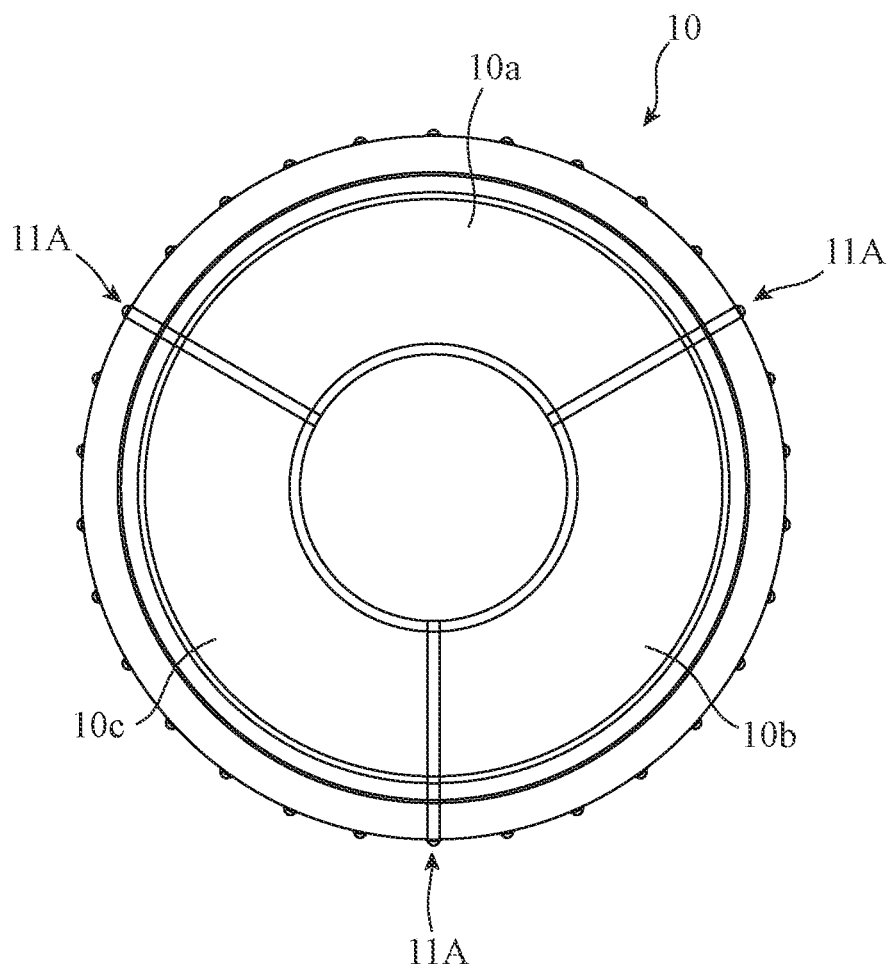
FIG. 8 is a diagram in which an operation portion of the knob according to Embodiment 2 is viewed from an upper surface.

FIG. 8 is a diagram in which an operation portion 10 of the knob 120 according to Embodiment 2 is viewed from an upper surface.

There is a difference in operation portion dividing portions 11 between the knob 120 according to Embodiment 1 and the knob 120 according to Embodiment 2. Hereinafter, an explanation of components having the same functions as those of the components explained in Embodiment 1 or components having like functions will be omitted or simplified.

In Embodiment 2, the operation portion dividing portions 11 are referred to as the operation portion dividing portions 11A. The operation portion dividing portions 11A do not physically divide the operation portion 10, unlike the operation portion dividing portions 11 according to Embodiment 1.

The operation portion dividing portions 11A are non-conductive areas formed in the operation portion 10. The operation portion dividing portions 11A are areas that are formed by performing neither conductive coating nor plating treatment on the operation portion 10.

FIG. 8 shows an example in which operation portion dividing portions 11A are disposed at three places. The operation portion 10 is divided by the operation portion dividing portions 11A at the three places into a first operation portion 10a, a second operation portion 10b, and a third operation portion 10c. The first operation portion 10a, the second operation portion 10b, and the third operation portion 10c are conductive areas.

The first operation portion 10a and the second operation portion 10b are divided from each other and insulated from each other by an operation portion dividing portion 11A. Similarly, the second operation portion 10b and the third operation portion 10c are divided from each other and insulated from each other by the operation portion dividing portion 11A. Similarly, the division into the third operation portion 10c and the first operation portion 10a are divided from each other and insulated from each other by the operation portion dividing portion 11A.

As mentioned above, according to Embodiment 2, the occurrence of non-detection and erroneous detection of a touch of a finger on the knob can be prevented, just as in the case of Embodiment 1.

Embodiment 3

Figure 9:
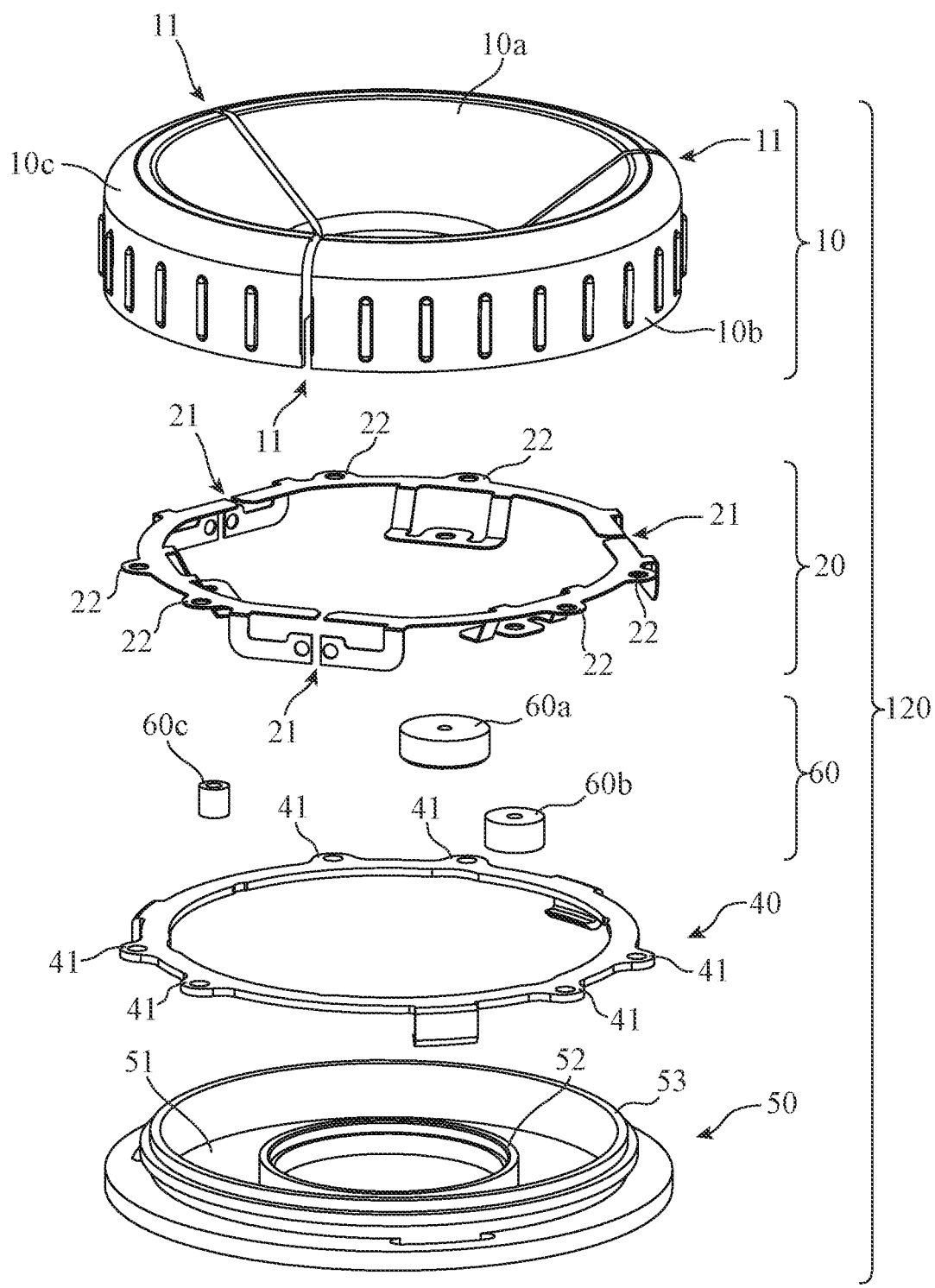
FIG. 9 is an exploded view of a knob according to Embodiment 3.

FIG. 9 is an exploded view of a knob 120 according to Embodiment 3.

There is a difference in conducting terminal portions 30 between the knob 120 according to Embodiment 1 and the knob 120 according to Embodiment 3. Hereinafter, an explanation of components having the same functions as those of the components explained in Embodiment 1 or components having like functions will be omitted or simplified.

In Embodiment 1, the case in which the conducting terminal portions 30 are comprised of the first conducting terminal portion 30a, the second conducting terminal portion 30b, and the third conducting terminal portion 30c is explained. The first conducting terminal portion 30a, the second conducting terminal portion 30b, and the third conducting terminal portion 30c have the same diameter.

In Embodiment 3, conducting terminal portions 60 are used instead of the conducting terminal portions 30. The conducting terminal portions 60 are comprised of a first conducting terminal portion 60a, a second conducting terminal portion 60b, and a third conducting terminal portion 60c.

The first conducting terminal portion 60a, the second conducting terminal portion 60b, and the third conducting terminal portion 60c differ in diameter from each other and differ from each other in the areas of their surfaces in contact with a concave groove 51 (hereinafter each referred to as "contact surface").

For example, the diameter $\phi$ of the first conducting terminal portion 60a is 9 mm, and the area of the contact surface of the first conducting terminal portion 60a is the largest.

For example, the diameter $\phi$ of the second conducting terminal portion 60b is 6 mm, and the area of the contact surface of the second conducting terminal portion 60b is smaller than that of the first conducting terminal portion 60a.

For example, the diameter $\phi$ of the third conducting terminal portion 60c is 3 mm, and the area of the contact surface of the third conducting terminal portion 60c is smaller than that of the second conducting terminal portion 60b.

Figure 10:
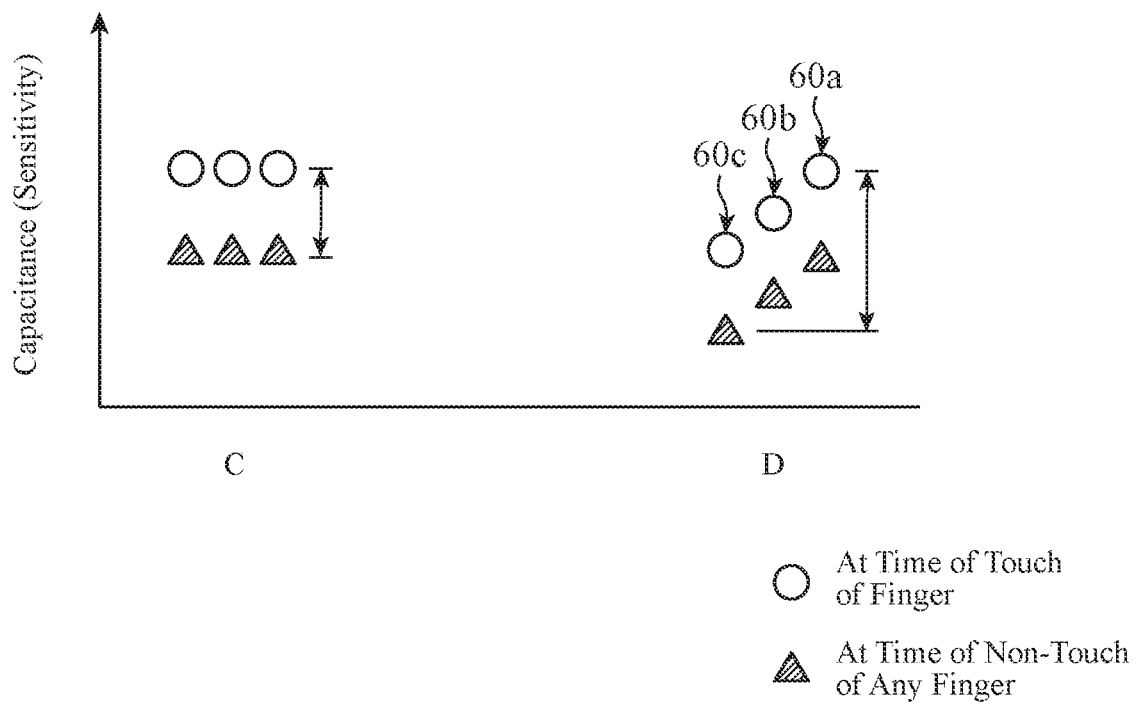
FIG. 10 is a graph for explaining a change of the capacitance detected by a touch panel.

FIG. 10 is a graph for explaining a change in the capacitance detected by a touch panel 111.

FIG. 10 shows the capacitance detected by the touch panel 111 when no finger touches an operation portion 10 (at the time of non-touch of any finger), and the capacitance detected by the touch panel 111 when a finger touches the operation portion 10 (at the time of a touch of a finger) for each of the conducting terminal portions.

A left-hand side (hereinafter referred to as "C") of FIG. 10 shows a case in which conducting terminal portions 30 with contact surfaces having the same area are used. On the other hand, a right-hand side (hereinafter referred to as "D") of FIG. 10 shows a case in which the conducting terminal portions 60 according to this Embodiment 3 (the first conducting terminal portion 60a, the second conducting terminal portion 60b, and the third conducting terminal portion 60c) are used.

In the case of "C", the capacitance detected at the first, second, and third conducting terminal portions 30a, 30b, and 30c by the touch panel 111 at the time of non-touch of any finger is the same as each other, and the capacitance detected at the first, second, and third conducting terminal portions 30a, 30b, and 30c by the touch panel 111 at the time of a touch of a finger is the same as each other.

In the case of "D", the capacitance detected at the first, second, and third conducting terminal portions 60a, 60b, and 60c by the touch panel 111 at the time of non-touch of any finger differs from each other, and the capacitance detected at the first, second, and third conducting terminal portions 60a, 60b, and 60c by the touch panel 111 at the time of a touch of a finger differs from each other.

The capacitance detected by the touch panel 111 at the time of non-touch of any finger in the third conducting terminal portion 60c is relatively small compared with the capacitances detected at the time of non-touch of any finger in the second conducting terminal portion 60b and the first conducting terminal portion 60a.

Further, the capacitance detected by the touch panel 111 at the time of a touch of a finger in the first conducting terminal portion 60a is relatively large compared with the capacitances detected at the time of a touch of a finger in the second conducting terminal portion 60b and the third conducting terminal portion 60c.

As mentioned above, in the case of "D", the difference (the amount of change in the capacitance) between the capacitance detected by the touch panel 111 at the time of non-touch of any finger in the third conducting terminal portion 60c and the capacitance detected by the touch panel 111 at the time of a touch of a finger in the first conducting terminal portion 60a is large. As a result, the accuracy with which to detect a touch of a finger on the operation portion 10 can be further improved as compared with the case of "C".

In the above explanation, the case in which the first conducting terminal portion 60a, the second conducting terminal portion 60b, and the third conducting terminal portion 60c are constructed so as to differ from one another in the areas of their contact surfaces in contact with the concave groove 51 is explained.

However, it is not limited to this case, and only one conducting terminal portion 60 (e.g., the first conducting terminal portion 60a) may differ from the other conducting terminal portions in the areas of their contact surfaces, and the two remaining conducting terminal portions 60 (e.g., the second conducting terminal portion 60b and the third conducting terminal portion 60c) may be identical in the areas of their contact surfaces.

Further, two conducting terminal portions 60 may be included, and the two conducting terminal portions 60 may be constructed in such a way that the areas of their contact surfaces differ from each other.

Further, four or more conducting terminal portions 60 may be included, and at least two of the four or more conducting terminal portions 60 may be constructed in such a way that the areas of their contact surfaces differ from each other.

As mentioned above, according to Embodiment 3, the occurrence of non-detection and erroneous detection of a touch of a finger on the knob can be further prevented.

It is to be understood that any combination of two or more of the above-mentioned embodiments can be made, various changes can be made in any component according to the above-mentioned embodiments, and any component according to the above-mentioned embodiments can be omitted within the scope of the present invention.

INDUSTRIAL APPLICABILITY

Since the knob according to the present invention can prevent the occurrence of non-detection and erroneous detection of a touch of a finger on the knob, the knob is suitable for being mounted in a display mounted and equipped with a capacitive type touch panel in a vehicle.

REFERENCE SIGNS LIST

10: operation portion,
10a: first operation portion,
10b: second operation portion,
10c: third operation portion,
11, 11A: operation portion dividing portion,
20: conductive connecting member,
20a: first conductive connecting member,
20b: second conductive connecting member,
20c: third conductive connecting member,
21: conductive connecting member dividing portion,
22: conductive connecting member flange portion,
23a: first mounting portion,
23b: second mounting portion,
23c: third mounting portion,
30, 60: conducting terminal portion,
30a, 60a: first conducting terminal portion,
30b, 60b: second conducting terminal portion,
30c, 60c: third conducting terminal portion,
40: rotary member,
41: rotary member flange portion,
50: rotary supporting member,
51: concave groove,
52: first wall portion,
53: second wall portion,
100: input device,
110: touch panel-equipped display,
111: touch panel, and
120: knob.

The invention claimed is:

1. A knob comprising:
a ring-shaped operation member comprised of conductive material, a rotational operation being performed on the operation member;
a ring-shaped rotary supporting member comprised of non-conductive material, formed with a ring-shaped concave groove, and fixed onto a capacitive type touch panel, the rotary supporting member rotatably supporting the operation member;
and
at least two conductive conducting terminal members disposed inside the concave groove, the conducting terminal members being moved along the concave groove when the operation member is rotated with respect to the rotary supporting member, positions of the conducting terminal members being detected by the touch panel, wherein the operation member is divided into a plurality of arc-shaped portions in a circumferential direction, the arc-shaped portions being electrically insulated from each other, and the conducting terminal members being mounted to and electrically connected to the respective arc-shaped portions of the operation member.

2. The knob according to claim 1, further comprising a conductive connecting member electrically connected to the operation member and rotating integrally with the operation member, wherein the conductive connecting member presses the plurality of conducting terminal members against the concave groove, and also applies a force in a direction toward a center of rotation to the rotary supporting member.

3. The knob according to claim 1, wherein the at least two conducting terminal members have surfaces that are in contact with the concave groove and different from each other in area.

4. An input device comprising:

the knob according to claim 1;

a capacitive type touch panel to which the knob is fixed; and a display integral with the touch panel, for displaying information.

* * * * *